C. ENDORF, Jr.
MOUNTING FOR ELECTRIC VIBRATORS.
APPLICATION FILED APR. 13, 1914.
1,231,245.
Patented June 26, 1917.
2 SHEETS—SHEET 1.
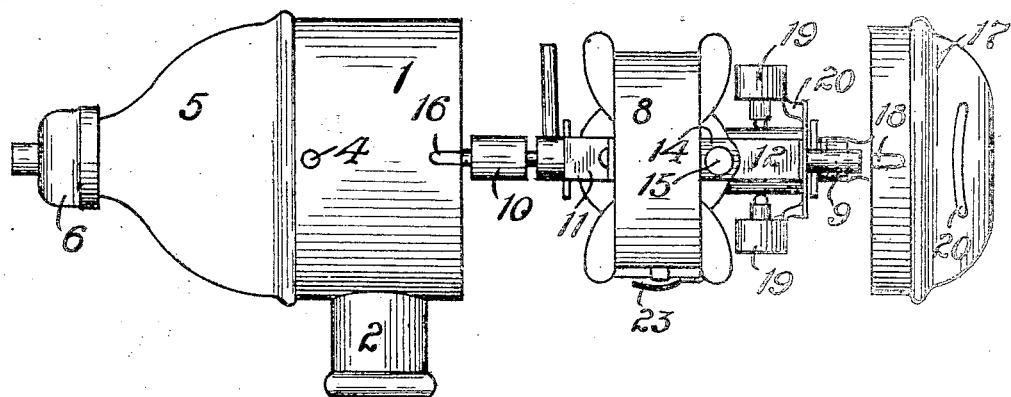
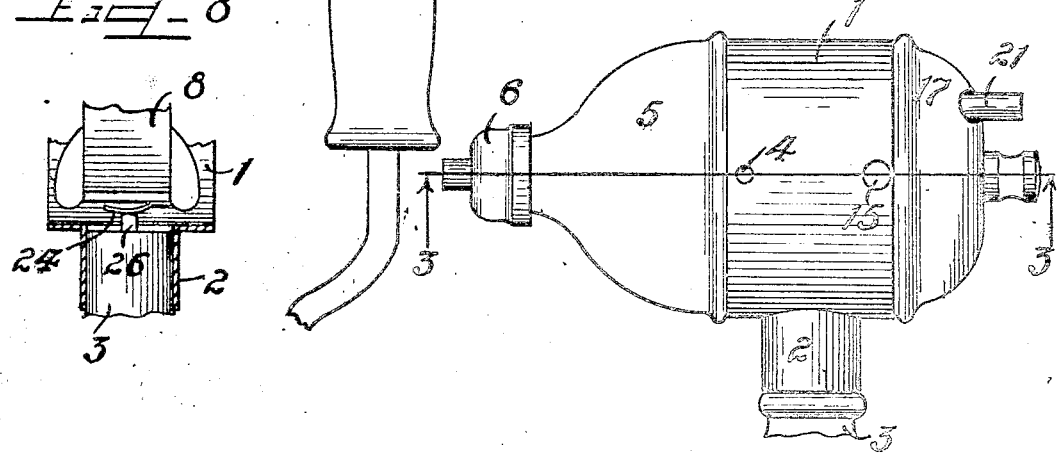
Witnesses
Victor Siljander
Charles...
Inventor
Charles Endorf Jr.
Charles... Atty

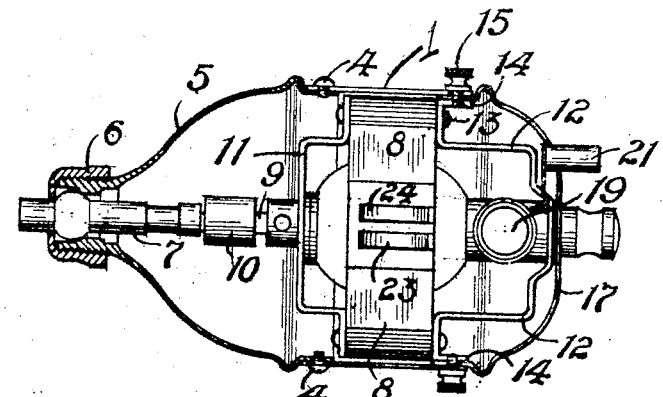

UNITED STATES PATENT OFFICE.

CHARLES ENDORF, JR., OF CHICAGO, ILLINOIS, ASSIGNOR TO LINDSTROM, SMITH COMPANY, OF CHICAGO, ILLINOIS, A CORPORATION OF ILLINOIS.

MOUNTING FOR ELECTRIC VIBRATORS.

1,231,245.            Specification of Letters Patent.     Patented June 26, 1917.

Application filed April 13, 1914. Serial No. 831,407.

*To all whom it may concern:*

Be it known that I, CHARLES ENDORF, Jr., a citizen of the United States, and a resident of the city of Chicago, in the county of Cook and State of Illinois, have invented certain new and useful Improvements in Mountings for Electric Vibrators; and I do hereby declare that the following is a full, clear, and exact description of the same, reference being had to the accompanying drawings, and to the numerals of reference marked thereon, which form a part of this specification.

This invention relates to an improved casing or mounting for a motor of an electric vibrator whereby the motor may be easily removed from the casing without detaching any of the parts and requiring only a loosening of certain of the screws.

It is an object of this invention to construct an electric vibrator consisting of a casing with a motor mounted therewithin, driving a vibrator applicator through a suitable eccentric, the whole contained within a shell provided with detachable cap portions whereby said cap portions and the motor within the shell may be easily removed without disconnection or adjustment of the parts.

It is also an object of this invention to construct a mounting for the motor and parts of an electric vibrator, whereby by merely loosening a few screws the motor and parts may be removed from the casing or mounting without further adjustment.

It is furthermore an object of this invention to construct a device wherein the bearing brackets of a motor are flanged and tapped to receive screws therein and the casing and cap or shell for the casing containing the motor are complementally slotted to receive said screws therethrough threaded into said flanged portions whereby upon loosening the screws said cap or shell may be removed from the casing and at the same time permitting the motor to be withdrawn therefrom.

It is finally an object of this invention to greatly simplify the assembly of the parts of an electric vibrator to permit ready access to the interior thereof for repairs without necessitating troublesome adjustments.

The invention (in a preferred form) is illustrated in the drawings and hereinafter more fully described.

In the drawings:

Figure 1 is a side view of a vibrator with the cap and motor removed therefrom.

Fig. 2 is a similar view with the parts completely assembled.

Fig. 3 is a section taken on line 3—3 of Fig. 2.

Fig. 4 is an end view of the vibrator with the cap removed, illustrating the motor contained within the casing.

Fig. 5 is an end view of the device with the handle omitted.

Fig. 6 is a fragmentary top plan view of the casing showing the means of connecting the cap thereto.

Fig. 7 is a fragmentary section on line 7—7 of Fig. 6.

Fig. 8 is a fragmentary detail taken on line 8—8 of Fig. 4, illustrating the resilient electric contact mechanism.

As shown in the drawings:

The device embraces a cylindrical casing 1, provided with an extension 2, into which a handle 3, is engaged. Secured on one end of said cylindrical casing 1, by means of screws 4, is a cap 5, the outer end of which is provided with a small apertured threaded cap 6, which, when removed, permits insertion of a piston 7, into the device. A motor, provided with arc shaped field pieces 8, and an armature shaft 9, is adapted to be inserted within the casing 1, with an eccentric 10, on said armature shaft engaging in the end of said piston 7.

Bearing brackets 11, are rigidly screwed to said field pieces on one side thereof to support one end of said armature shaft, and on the opposite side extended bearing brackets 12, are likewise screwed to said field pieces by means of screws 13, to afford a support for the other end of the armature shaft. Each of said bearing brackets 12, is provided with an integral extension or flange 14, projecting outwardly from the field pieces 8, and this flange is tapped to receive a small thumb screw 15, threaded therein. For this purpose the casing 1, is provided with slots 16, to permit engagement therethrough of said screws. A cap 17, is adapted to be connected on the outer end of the casing 1, also by means of said screws 15, and for this purpose said cap is slotted, as indicated by the reference numeral 18, to permit the cap to be slidably engaged within said casing 1, with said slots 18, engaging around the screws 15, and registering with said slots 16, so that the screws, when tightened, serve to clamp said casing 1, and said cap 17, together upon said extended flange 14, of the motor, holding the parts rigidly assembled together.

A pair of brushes 19, are mounted upon a bracket 20, which is rotatable upon the armature shaft and actuatable by means of a small lever 21, projecting through a slot 22, in said cap 17. In order to obviate delay in making and breaking the electrical connection when it is desired to remove the motor from the casing, resilient contact pieces 23 and 24, respectively, are insulatably mounted upon the bottom of the motor, and when the motor is inserted within the casing, bear upon the respective contact pins 25 and 26, which are rigidly mounted in the handle 3, of the device and project upwardly through the extension 2, of the casing.

The operation is as follows:

When it is desired to remove the motor from the casing of the device the thumb screws 15, are loosened, thus permitting the cap 17, to be disengaged from said casing 1, and thereafter the motor is easily removed from the casing, the screws 15, of course, sliding outwardly in the slots 16. Inasmuch as the electrical connections are effected through the resilient leaves 23 and 24, co-operating with the fixed pins 25 and 26, projecting upwardly through the bottom of the casing, no adjustments or disconnections of the circuit are necessary in order to remove the motor.

I am aware that various details of construction may be varied through a wide range without departing from the principles of this invention. I therefore do not purpose limiting the patent granted otherwise than necessitated by the prior art.

I claim as my invention:

1. In a device of the class described a casing, a motor insertible therein, caps to fit over the ends of said casing to inclose the motor therewithin, extended flanges on said motor, screws engaging through one of said caps and said casing to releasably secure the same together, and thumb screws engaging through the other one of said caps and said casing and into said flanges to releasably connect the device in assembled relation.

2. In a device of the class described a casing, a cap therefor, a motor slidable in the casing, resilient electrical contacts to permit ready removal or insertion of the motor, said cap and casing having slots therein adapted to register with one another, and means engaging therethrough and into the motor releasably holding said cap and casing engaged with the motor rigidly mounted therewithin.

3. In a device of the class described a casing, a cap adapted to fit over one end thereof, said casing and cap having slots adapted to register with one another, another cap removably secured on the other end of said casing, a projection forming a part of said motor, and means engaging in said projection and through said registering slots of said first mentioned cap and casing to hold said cap, casing and motor rigidly and releasably connected with one another.

4. In a device of the class described, a slotted casing, an extension integrally formed thereon adapted to receive a handle, a motor slidably mounted in the casing, a cap adapted to fit between said motor and casing, said cap having slots therein adapted to register with the slots in said casing, and means engaging said slots and said motor for rigidly, but releasably, holding said cap, motor and casing connected to one another.

5. In a device of the class described a casing, a motor removably mounted therein, bearing brackets forming a part of said motor, an extended flange on said bearing brackets, screws threading therein and through slots in said casing to hold the motor within the casing, and a cap provided with slots to register with said slots in the casing adapted to be retained in position by said screws.

6. In a device of the class described, a slotted casing, a motor removably mounted therein, bearing brackets thereon, a flange on each of said brackets, a slotted cap adapted to engage between said casing and said flanges, and screws adapted to project through said slots and be threaded into said flanges to clamp the motor and cap in position and permit removal of the motor and cap from said casing merely by loosening the screws without removal thereof.

In testimony whereof I have hereunto subscribed my name in the presence of two subscribing witnesses.

CHARLES ENDORF, JR.

Witnesses:
CHARLES W. HILLS, Jr.,
FRANK K. HUDSON.